US008125186B2

(12) United States Patent
Carkner

(10) Patent No.: US 8,125,186 B2
(45) Date of Patent: Feb. 28, 2012

(54) GRAPHIC STATE OF CHARGE INDICATOR FOR A BATTERY CHARGING SYSTEM AND METHOD OF USE

(76) Inventor: Steve Carkner, Ottawa (CA)

( * ) Notice: Subject to any disclaimer, the term of this patent is extended or adjusted under 35 U.S.C. 154(b) by 863 days.

(21) Appl. No.: 12/140,131

(22) Filed: Jun. 16, 2008

(65) Prior Publication Data

US 2009/0309548 A1    Dec. 17, 2009

(51) Int. Cl.
*H02J 7/00* (2006.01)
(52) U.S. Cl. .............. 320/132; 324/426; 320/DIG. 21; 320/DIG. 18; 320/DIG. 19
(58) Field of Classification Search .. 320/DIG. 18–DIG. 21, 132; 324/426
See application file for complete search history.

(56) References Cited

U.S. PATENT DOCUMENTS

| 5,406,188 A | * | 4/1995 | Myslinski et al. | 340/636.1 |
| 5,508,600 A | * | 4/1996 | Myslinski et al. | 340/636.1 |
| 5,656,919 A | * | 8/1997 | Proctor et al. | 320/153 |
| 5,691,078 A | * | 11/1997 | Kozaki et al. | 324/428 |
| 5,699,050 A | * | 12/1997 | Kanazawa | 340/636.13 |

* cited by examiner

*Primary Examiner* — Samuel Berhanu
(74) *Attorney, Agent, or Firm* — Gordon Thomson

(57) ABSTRACT

A graphic state of battery charge indicator is used to provide the user with a visual indication of state of battery charge, magnitude of current flow and direction of current flow by using displays such as multi-segment LCD or LED displays in the shape of a battery. The indicator is able to provide these parameters by sequencing the on/off operation of the segmented displays. A microcontroller is provided battery state data from a battery monitor and converts this information to on/off commands for the segmented displays. There may be up to 10 segmented displays in the indicator with each segment proportionally representing a percentage of the state of battery charge. State of charge is indicated by a single on display at the appropriate location in the display. Current flowing into the battery is represented by a ripple effect in the displays in the positive direction. Current flowing out of the battery is represented by a ripple effect in the display in the negative direction.

15 Claims, 5 Drawing Sheets

GRAPHIC STATE OF CHARGE INDICATOR FOR A BATTERY CHARGING SYSTEM AND METHOD OF USE

FIELD OF THE INVENTION

This invention relates to battery charging systems and more particularly to a graphic state of charge indicator for such a system and method of use whereby battery charging systems can be monitored for state of charge/discharge and rate of charge/discharge using a graphic indicator.

BACKGROUND OF THE INVENTION

Advanced mobile power systems such as lithium based rechargeable battery packs often include a capacity display of some sort. This capacity display is generally referred to as a State of Charge indicator and may be as complex as a numerical representation of the capacity of the battery, or as simple as a single indicator light for low battery conditions.

The conventional method for recharging these battery pack systems is to provide a plug-in charge connection through a direct household electrical connection, through a vehicle power system, or through a computer power system such as a USB (Universal Serial Bus) port.

Different rechargeable battery technologies require different charging techniques. A popular battery charging technology is called CCCV or Constant Current Constant Voltage charging. This charging technique uses a controlled current to recharge the battery during the first phase of charging. As the battery nears fully charged the charger voltage reaches a point where it is limited and the current is allowed to fall. This method of charging is most commonly used in ion-exchange systems such as Lithium Ion based batteries.

The state of charge system sometimes indicates if the system is charging by flashing either the entire display or by flashing the highest capacity indicator element. This flashing is strictly binary in that it indicates either that the battery is charging or is not charging.

The state of charge indication devices commonly in use do not provide an indication that the system they are monitoring is supplying a load.

Solar, hand-crank and fuel-based charging systems may be used to recharge a portable power system. These chargers have the advantage of providing a portable recharging solution to accompany the portable power storage system. The principle disadvantage of these chargers is that it is difficult or impossible in most applications to determine if the charger is putting out a significant amount of power, or if it is in an optimal configuration to provide power.

Further, there is not a good way to determine if these portable charging solutions are actually producing enough power to exceed the demand of the load which may still be connected to the system.

There exists a need for a graphic state of charge indicator for battery charging systems that provides state of charge indication but also provides more information with respect to recharge rate and discharge rate such that the battery charger can be optimally configured to provide the fastest recharge time possible. There is also a need for such indicator to be easy to read, to be similar in appearance to existing state of charge indicators and to be physically small to fit the natures of these complete portable solutions.

SUMMARY OF THE INVENTION

In one embodiment of the invention there is provided a graphic state of charge display for a battery charging system shaped like a battery for use on conventional battery operated equipment such as cellular phones and music players. In one embodiment, the display contains a LCD display having between 3 and 10 but generally 5 segments LCD which is coupled to a microcontroller that is configured to measure the state of charge of the battery. The microcontroller has the ability to measure the amount of current flowing into or out of the battery pack to an external load and is able to provide this information to the user using the same 5 segment LCD display in a way that is intuitive and easy to understand.

The actual form of the state of charge indicator, the battery pack and the recharge or discharge methods can be changed without detracting from the essence of the invention which is to use the state of charge indicator as a state of load and state of recharge indicator. The display may be composed of a battery icon with the segment indicators arranged beside the icon with each indicator segment a different size to indicate capacity, or the segments may be arranged around a battery icon or be associated with printed numerical indicators to further define the capacity they represent.

OBJECTS AND ADVANTAGES OF THE INVENTION

It is an object of the invention to provide a state of charge indicator for a battery charging system that is similar in appearance to existing state of charge indicators.

Another object of the invention is to provide a state of charge indicator that can also provide information to the user which is intuitive and easy to understand.

Yet another object of the invention is to provide a state of charge indicator that conveys additional information with respect to the rate of load or the rate of recharge.

It is a further object of the invention to permit users to better understand how their particular equipment works and to be able to optimize the use of such loads and recharge sources.

One advantage of the invention is that it can be used to optimize a portable photovoltaic (PV) battery charging system by displaying to a user how orientation of the PV array to the sun changes the voltage and current output of the array and therefore battery recharge power available.

A further advantage of the invention is that the LCD display format is a familiar to the user and so data can be presented to the user in a less complicated manner.

Yet another advantage of the invention is that the LCD display is small in size and so easy to implement from an electronics point of view.

Still another advantage of the invention is that the LCD display is less expensive than a system with more complicated display technology.

A further advantage of the invention is that multiple pieces of critical information may be combined in a single, simple display, to easily determine if a rechargeable system which is connected to both a load and a recharge source is actually charging, that is, is the load drawing more power than the charging source is capable of producing, resulting in a net-drain on the battery system.

DETAILED DESCRIPTION

Figure 1:
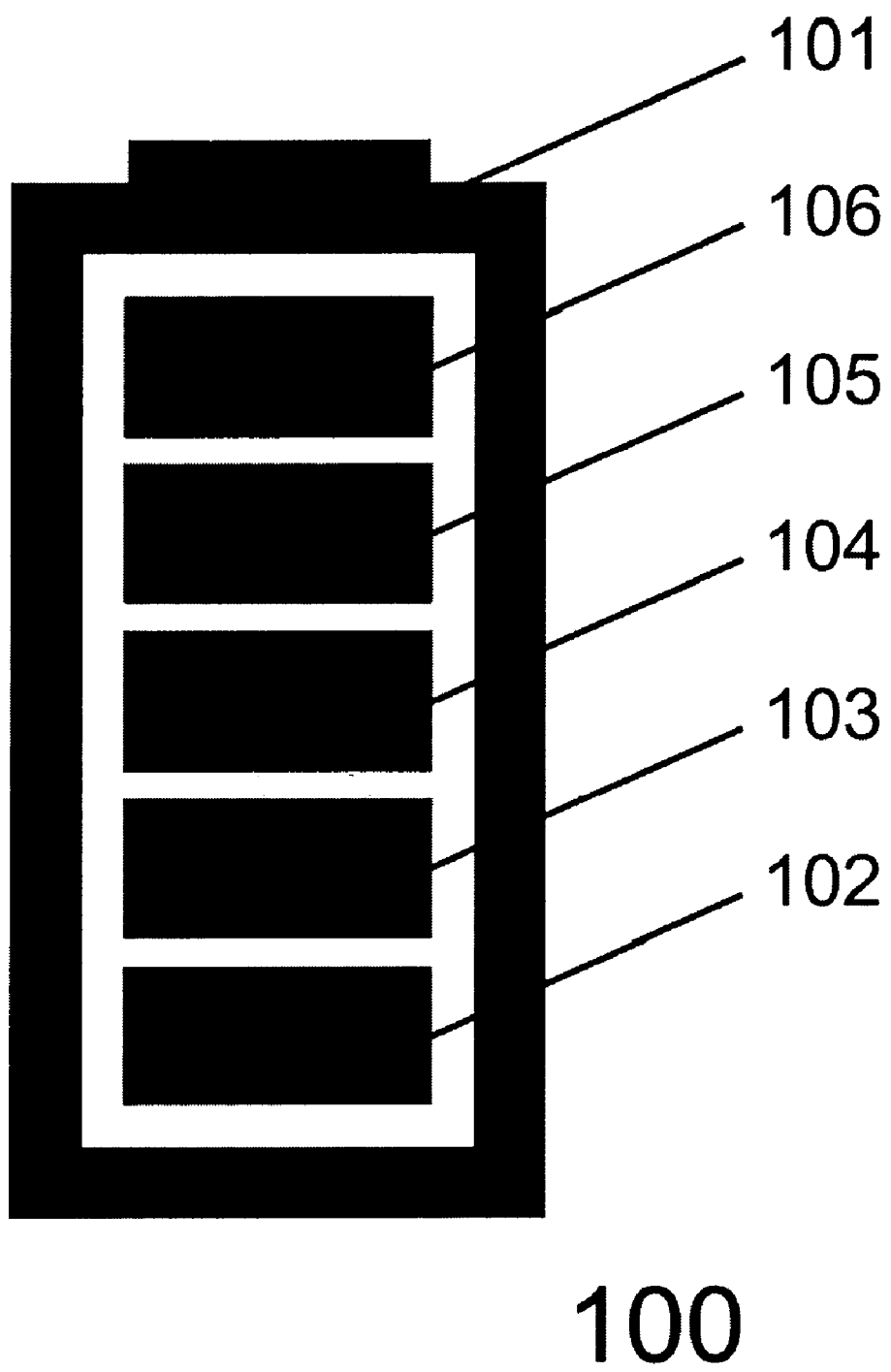
FIG. 1 is a sketch of a battery state of charge indicator.

Referring to FIG. 1, a battery state of charge indicator (100) for a battery charging system is shown that is conventional in appearance and therefore easy to understand by the user. The indicator has a graphic outline (101) designed to look like a battery. The battery outline contains between 3 and 10 and generally five (as illustrated) active LCD segments with the bottom segment (102) representing a depleted battery and the top segment (106) representing a fully charged battery. Intermediate segments (103, 104, and 105) represent other intermediate charge levels. The graphical representation of the battery can take any reasonable format and that the number, arrangement and order of the indicator segments could take any reasonable form. The indicator itself could be composed of a wide variety of indicator technologies including but not limited to LCD, LED, organic LED, DLP and active matrix styles.

The battery state of charge indicator 100 of FIG. 1 may have no indicator segments enabled to indicate a completely discharged battery. It would enable the bottom segment (102) to indicate a battery that is nearly empty, perhaps 1 to 20% capacity. Each subsequent indicator segment would indicate an additional 20% (or other value as required by the application) such that the top segment (106) would be enabled for a battery with 80-100% capacity. The individual indicator segments may also flash to indicate when the battery is connected to a charger.

Figure 2:
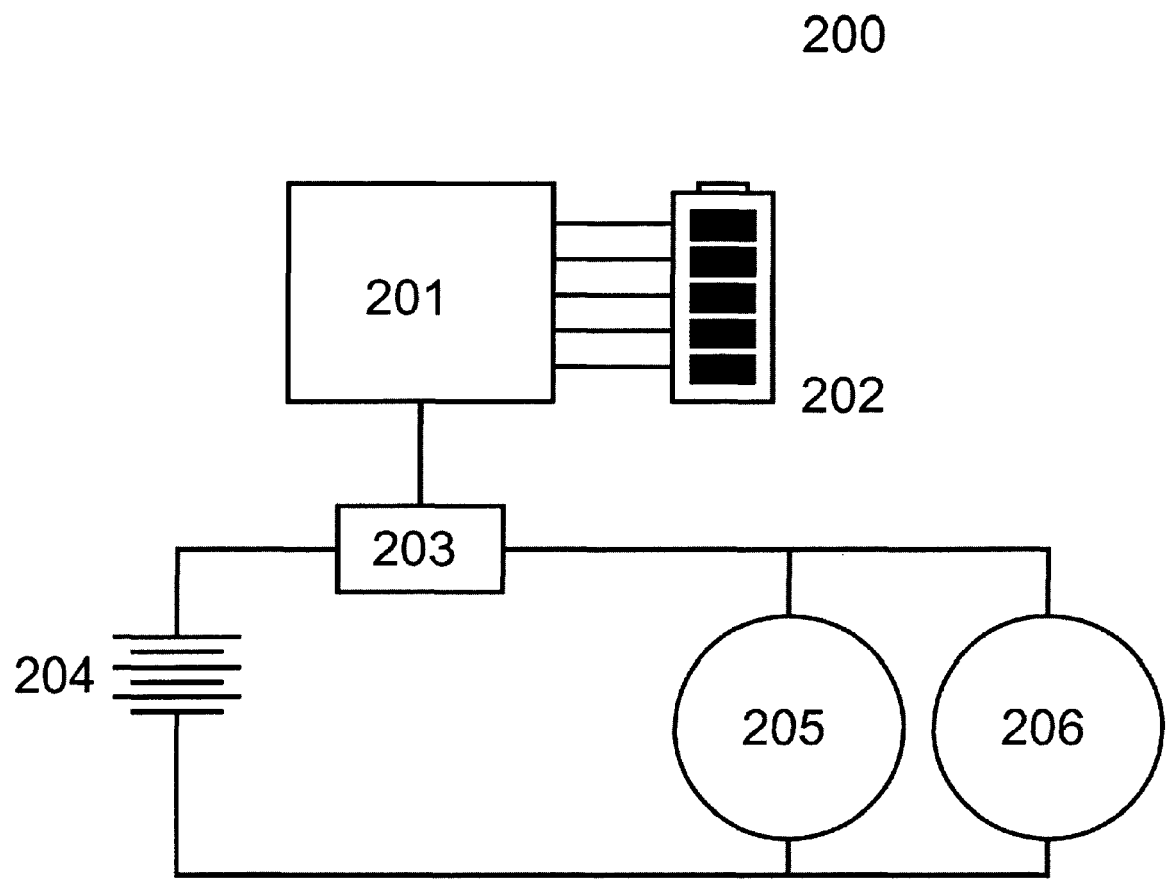
FIG. 2 is a block diagram of a complete monitoring system.

Referring to FIG. 2, in the battery monitoring system 200 illustrated, a microcontroller (201) is connected to the graphic state of charge indicator (202). The microcontroller (201) is also connected to a battery monitor (203) that will provide information on the current flowing into or out of the battery (204). The battery monitor (203) may also provide information with respect to battery capacity and state of health through temperature and voltage measurements that may be displayed using some other display means. The battery (204) may be any rechargeable type of battery and may be composed of any number or arrangement of cells and could contain voltage translator circuitry that allows the battery to match the current and voltage requirements of the overall system.

The user may connect an at least one load (205) to the system. The load (205) may also contain circuitry to match the voltage and current requirements of the load.

The battery (204) is recharged by at least one charge source (206) which may be composed of PV, fuel cell, mechanical or any other type or combination of power generating devices. The charge source (206) may contain other circuitry to match the current and voltage requirements of the battery (204) or load (205).

The system is configurable such that the load (205) and charge source (206) may be removable and can be composed of multiple loads and multiple charge sources. Where multiple charge sources and loads are used, the battery monitor will display the net effect on battery capacity, which may be a net charging or a net discharging effect depending on the types and configuration of all the sources and loads in the system. The battery monitor (203) may be configured to monitor multiple charge and load sources from multiple batteries without departing from the intention of this invention.

When the microcontroller (201) detects that current is neither flowing into or out of the battery, the display (202) will show a static representation of the battery state of charge with an appropriate number of segments enabled.

Figure 3:
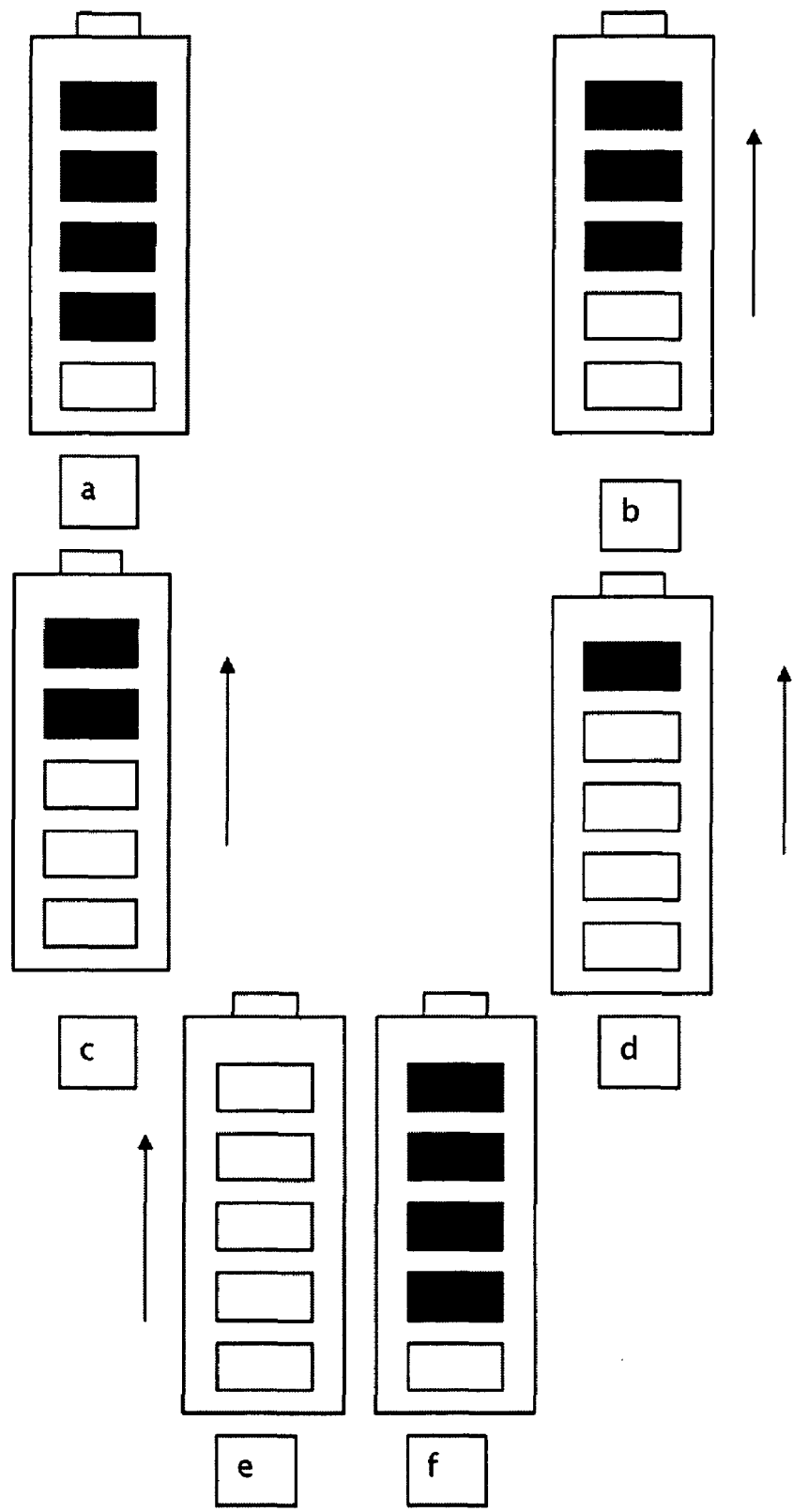
FIG. 3 is an illustration of the ripple effect of LCD enablement indicating charging.

Referring now to FIG. 3, when the microcontroller (201) detects that current is flowing into the battery; this indicates that the system is gaining in overall capacity. The microcontroller will then periodically display a positive ripple effect on the display. The ripple effect shall be defined as activating the lowest indicator (FIG. 3*a*) segment followed by the next highest indicator segment (FIG. 3*b*) and so on (FIG. 3*c* to FIG. 3*e*) until all segments from least to greatest are activated in sequence (FIG. 3*e*). After the ripple effect is complete the display shall revert to displaying static battery capacity again (FIG. 3*f*).

The rate of the ripple effect, that is the rate that the LCD enablement moves from the least segment (FIG. 3*a*) to the greatest segment (FIG. 3*e*), is proportional to the magnitude of charge flowing into the battery. The rate of the ripple effect and hence magnitude of charge flowing in to the battery can be illustrated to the user by adjusting the period between the ripple effect display. The more often the ripple effect is displayed to the user the greater the magnitude of charge. Another method to illustrate magnitude of charge is by reducing the time period between each segment being activated so that the greater the magnitude of charge the faster the display will go from bottom (FIG. 3*a*) to top (FIG. 3*e*), a variable ripple rate. In other examples of the invention both methods of display can be used. In all cases it is expected that the period of time spent displaying the static battery capacity (FIG. 3*f*) shall exceed the time spent displaying the ripple effect so that the two types of information provided to the user, rate of charge and state of charge, can be distinguished.

The variable ripple rate is one advantage of this invention. In know displays, a battery charge can be indicated by a similar type of ripple effect on a 5 segment LCD. However, the ripple rate of these types of known displays is constant and the information provided to the user is only that a charge is being provided to the battery, the presence of a load is not displayed. The magnitude of the charge remains unknown. In my invention, the magnitude of the charge is displayed to the user by a variable ripple rate. The greater the ripple rate the greater the magnitude of charge. Using this innovative feature of my invention the proper orientation of a PV array towards the sun can be selected. The user can manipulate the orientation of the PV array while monitoring the ripple rate. The orientation where the ripple rate is greatest is the optimal orientation of the PV array because the magnitude of charge current will be greatest at that point.

Figure 4:
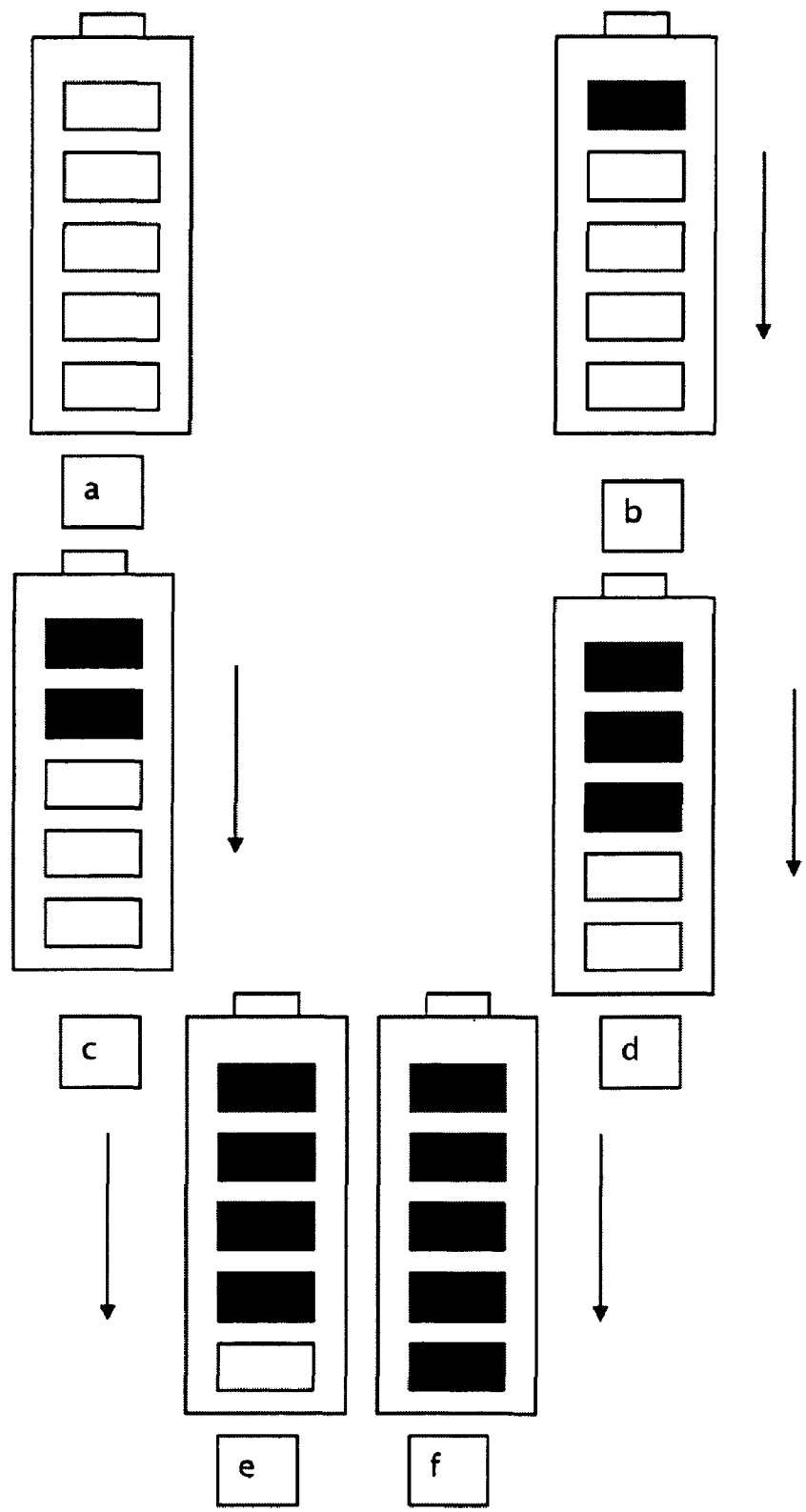
FIG. 4 is an illustration of the ripple effect of LCD enablement indicating discharging.

In addition to displaying charge rate using a positive ripple effect display, the system is capable of displaying the rate of discharge using a negative ripple effect display. Referring to FIG. 4, the negative ripple effect shall be defined as activating all of the indicator segments (FIG. 4*a*), then deactivating the most significant indicator segment followed (FIG. 4*b*) by the second most significant segment and so on until all segments are inactive (FIG. 4*f*). The rate at which the ripple effect occurs is determined by the magnitude of charge flowing out of the battery. This can be done by either reducing the period between the ripple displays, by reducing the time period between each segment being deactivated, or both. In all cases it is expected that the period of time spent displaying the static battery capacity shall exceed the time spent displaying the ripple effect. A user can use the information on the display to effect changes to the way they are using their product, and to estimate the efficacy of those changes through, for example, dimming a light, adjusting sound volume, or disabling features of the load such that the discharge rate is reduced.

Figure 5:
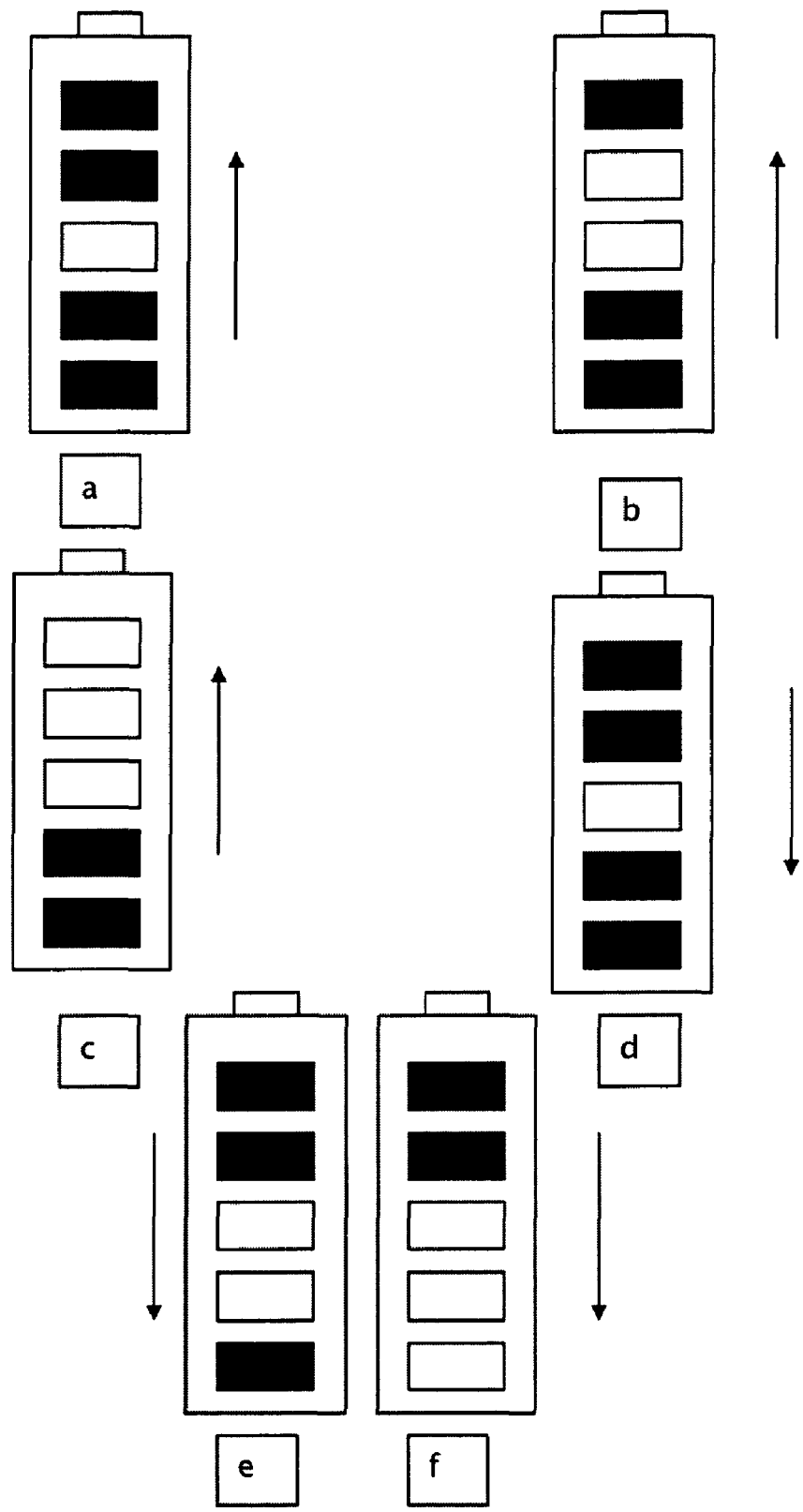
FIG. 5 is an illustration of another embodiment of the ripple effect of LCD enablement.

Referring now to FIG. 5, the description of the ripple display effect provided above is only one example of a graphic display that is easy to understand and intuitive to interpret. The graphic image of a battery icon emptying or filling up, and the rate at which it is doing so can be clearly interpreted by watching the display and the rate of the ripple in either a positive (charging) or a negative (discharging) direction. In my invention, other graphic display options are possible that will provide a similar informational function to the user. For example, the ripple effect can be modified so that only one LCD segment is active at any time to display state of charge (FIG. 5a illustrating a half-charge or half-discharge situation). In this case, the ripple would originate at the active LCD (FIG. 5a). In the case of a positive ripple, only those segments above the activated LCD segment would enable (FIG. 5a to FIG. 5c). In the case of a negative ripple, only those segments below the activated segment would enable (FIG. 5d to FIG. 5f).

In all examples of my invention there will be at least one battery status display with at least one multi-segment LCD indicator. The LCD indicator would be used to display battery capacity, but would be manipulated in a way such that the ripple rate of the indicators and their ripple direction provide information on at least three battery parameters for the user: battery capacity (single enable segment), capacity usage rate (ripple rate in a negative direction when the battery is discharging) and capacity recovery rate (ripple rate in a possible direction when the battery is charging).

In Operation

A method of using a graphic state of battery charge indictor in a battery charging system comprising a source of charging power, a microcontroller and a battery monitor connected to said microcontroller and adapted to provide a plurality of battery operating parameters for display on the graphic state of battery charge indicator wherein the graphic state of battery charge indicator comprises a plurality of display segments including a top segment and a bottom segment adapted for on and off operation and arranged in the shape of a battery, the method comprising the following steps:

connecting the graphic state of battery charge indicator to the battery charging system;

adapting the battery monitor to detect and measure a plurality of battery parameters including battery temperature, current direction and magnitude and voltage flowing into and out of the battery;

sending the plurality of battery parameters to the microprocessor;

converting the plurality of battery parameters to on and off signals for the display segments; and, sending the on and off signals as required to the graphic state of battery charge indicator in a predetermined sequence for visual display.

The method further comprising the steps of:

sending off signals to the plurality of display segments when the battery is in a depleted state;

sending an on signal to the bottom display segment when the battery is in its lowest charge state;

sending an on signal to the top display segment when the battery is in its fully charged state;

sending an on signal to an intermediate display element disposed between the top display segment and the bottom display segment when the state of charge of the battery is between the lowest charge state and said highest charge state wherein the relative position of the intermediate display segment indicates a relative state of charge of the battery between its lowest charge state and its highest charge state.

The method further comprising the steps of:

sending a positive ripple signal to the plurality of display segments when the current flow is positive into the battery;

sending a negative ripple signal to the plurality of display segments when the current flow is negative out of the battery; and, modulating the rate of ripple so that a fast ripple indicates a high current flow and a slow ripple indicates a low current flow.

Although the description above contains much specificity, these should not be construed as limiting the scope of the invention but as merely providing illustrations of some of the presently preferred embodiments of this invention. Logic, analog detection and control means may be implemented using integrated circuitry, microprocessor control, software and wireless control. Thus the scope of the invention should be determined by the appended claims and their legal equivalents.

What is claimed is:

1. A multi-mode display for graphically displaying a state of charge and a rate of charge for a battery connected to at least one load and a battery charging system, wherein said battery charging system comprises at least one source of charging power, a microcontroller for sensing said state of charge and rate of charge, wherein said multi-mode display is connected to said microcontroller, and wherein the multi-mode display comprises a plurality of horizontally stacked display segments commencing at a lowest magnitude segment and ending at a highest magnitude segment for displaying a plurality of indications representing the sensed state of charge and rate of charge;

wherein said plurality of horizontally stacked display segments display a positive ripple rate from said lowest magnitude segment to said highest magnitude segment and a negative ripple rate from the highest magnitude segment to the lowest magnitude segment;

wherein said positive ripple rate is directly proportional to said rate of charge.

2. The multi-mode display of claim 1, wherein each display segment of said plurality of horizontally stacked display segments has an enabled mode, a disabled mode and a blinking mode.

3. The display of claim 2, wherein the state of charge and rate of charge comprise at least the following:
   i. a state of charge of the battery;
   ii. a magnitude of said state of charge of the battery;
   iii. a direction of current flow; and,
   iv. a magnitude of said current flow.

4. The display of claim 3, wherein said state of charge of the battery and said magnitude of the state of charge of the battery are displayed.

5. The display of claim 3, wherein the state of charge of the battery, the magnitude of the state of charge of the battery and said direction of current flow are displayed.

6. The display of claim 3, wherein the state of charge of the battery, the magnitude of the state of charge of the battery, the direction of current flow and said magnitude of current flow are displayed.

7. The display of claim 3, wherein when the state of charge of the battery is sensed at least one display segment of said plurality of horizontally stacked display segments will operate in said enabled mode.

8. The display of claim 7, wherein when the magnitude of the state of charge of the battery is sensed a proportional number of the horizontally stacked display segments will operate in the enabled mode thereby displaying the state of charge and the magnitude of the state of charge.

9. The display of claim 8, wherein when said direction of said current flow is sensed the plurality of horizontally stacked segments will operate in one of said positive ripple mode and said negative ripple mode the result being that the positive ripple mode indicates a charging battery and the negative ripple mode indicates a discharging battery.

10. The display of claim 9, wherein when said magnitude of the current flow is sensed the positive ripple mode and the negative ripple mode will assume said variable ripple rate proportional to the magnitude of current flow, the result being that said ripple rate for a larger current flow is faster than the ripple rate for a smaller current flow, and the direction of current flow and the magnitude of current flow are displayed.

11. The display of claim 10, wherein when the battery is discharged the plurality of horizontally stacked segments will operate in said disabled mode.

12. The display of claim 11, wherein the state of charge of the battery, the magnitude of the state of charge of the battery, the direction of the current flow and the magnitude of the current flow are displayed sequentially over a predetermined period of time, and wherein within said predetermined period of time the state of charge of the battery and the magnitude of the state of charge of the battery will be displayed for a longer period of time than the direction of the current flow and the magnitude of the current flow.

13. A method for a multi-mode simultaneous display of a state of charge and a rate of charge of a battery comprising the steps of:

i. displaying a plurality of horizontally stacked display segments having an enabled mode, a disabled mode, a blinking mode and a rippling mode having a rippling rate, wherein a bottom display segment represents a lower value and a top display segment represents a higher value;

ii. sensing said state of charge and enabling at least said bottom display segment;

iii. sensing a magnitude of the state of charge and enabling a proportional number of horizontally stacked display elements;

iii. sensing a direction of current flow and enabling said rippling mode in the said direction of current flow between the bottom display segment to said top display segment;

iv. sensing rate of charge and displaying said rippling rate directly proportional to the sensing rate of charge;

v. sensing a discharged battery and disabling the plurality of horizontally stacked display segments.

14. The method of claim 13, wherein when said step of sensing said direction of current flow includes the step of sensing said battery charging and enabling the rippling mode from the bottom display segment to the top display segment.

15. The method of claim 13, wherein the step of sensing the direction of current flow includes the step of sensing the battery discharging and enabling the rippling mode from the top display segment to the bottom display segment.

* * * * *